(12) United States Patent
Jager et al.

(10) Patent No.: US 8,282,528 B2
(45) Date of Patent: Oct. 9, 2012

(54) METHOD FOR CONTROLLING A COMPRESSED AIR SUPPLY OF AN INTERNAL COMBUSTION ENGINE DURING A STARTING PROCESS

(75) Inventors: Thomas Jager, Meckenbeuren (DE); Christoph Ruchardt, Bodolz (DE); Roland Mair, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 296 days.

(21) Appl. No.: 12/867,307

(22) PCT Filed: Jan. 26, 2009

(86) PCT No.: PCT/EP2009/050823
§ 371 (c)(1),
(2), (4) Date: Aug. 12, 2010

(87) PCT Pub. No.: WO2009/103589
PCT Pub. Date: Aug. 27, 2009

(65) Prior Publication Data
US 2010/0331143 A1 Dec. 30, 2010

(30) Foreign Application Priority Data
Feb. 18, 2008 (DE) .................. 10 2008 000 326

(51) Int. Cl.
*F02D 23/00* (2006.01)

(52) U.S. Cl. ........................................ 477/32

(58) Field of Classification Search .............. 477/32, 477/167
See application file for complete search history.

(56) References Cited

U.S. PATENT DOCUMENTS

| | | | |
|---|---|---|---|
| 4,981,017 A | 1/1991 | Hara et al. | |
| 5,064,423 A | 11/1991 | Lorenz et al. | |
| 7,665,302 B2 | 2/2010 | Nemeth et al. | |
| 2007/0246008 A1 | 10/2007 | Gerum | |
| 2010/0318268 A1* | 12/2010 | Jager et al. | 701/54 |
| 2011/0045949 A1* | 2/2011 | Nemeth et al. | 477/33 |
| 2011/0237393 A1* | 9/2011 | Mair | 477/115 |
| 2011/0288730 A1* | 11/2011 | Schaffeld et al. | 701/54 |

FOREIGN PATENT DOCUMENTS

| | | |
|---|---|---|
| DE | 39 06 312 C1 | 12/1989 |
| DE | 195 18 317 A1 | 11/1996 |
| DE | 199 44 946 A1 | 3/2001 |
| DE | 102 48 401 A1 | 4/2004 |
| DE | 10 2006 008 785 A1 | 3/2007 |
| DE | 10 2006 027 865 A1 | 12/2007 |
| EP | 0 367 406 A2 | 5/1990 |
| EP | 1 316 447 A2 | 6/2003 |
| FR | 2 689 180 A1 | 10/1993 |
| GB | 2 422 872 A | 8/2006 |
| WO | 2005/064134 A1 | 7/2005 |
| WO | 2006/037564 A1 | 4/2006 |
| WO | 2006/089779 A1 | 8/2006 |
| WO | 2006/089780 A1 | 8/2006 |

* cited by examiner

*Primary Examiner* — Dirk Wright
(74) *Attorney, Agent, or Firm* — Davis & Bujold P.L.L.C.

(57) ABSTRACT

A method of operating a vehicle drive train (1) comprising a combustion engine (2), a turbo charger (22) assigned to the combustion engine, a mechanism for the injection of additional compressed air into an air intake system (8) of the combustion engine (2), a start and shift clutch (60), and a transmission (62). To optimally prepare and execute a start procedure of such an equipped vehicle, additional compressed air is only injected into the air intake system (8) of the combustion engine (2) if, depending upon the actual operating situation of the vehicle, the injection of additional compressed air benefits the safety of the driver, fuel consumption, drive comfort and/or the clutch wear.

9 Claims, 2 Drawing Sheets

METHOD FOR CONTROLLING A COMPRESSED AIR SUPPLY OF AN INTERNAL COMBUSTION ENGINE DURING A STARTING PROCESS

This application is a National Stage completion of PCT/EP2009/050823 filed Jan. 26, 2009, which claims priority from German patent application serial no. 10 2008 000 326.3 filed Feb. 18, 2008.

FIELD OF THE INVENTION

This invention concerns a method to operate a vehicle drive train with a combustion engine, a turbo charger assigned to this combustion engine, a mechanism to inject additional pressurized air into an air intake system of the combustion engine, a start clutch and a shift clutch, as well as a transmission, especially for the preparation and execution of a start procedure.

BACKGROUND OF THE INVENTION

It is known, for instance, through the patent applications WO 2006/037564 A1, WO 2006/089779 A1, and WO 2006/089780 A1 that a piston combustion engine, equipped with a turbo charger, generates at lower rotational speed a comparatively low torque, because the amount of air delivered, by a conventional turbo charger for a torque increase, into the intake system of the motor depends, determined by the system, on the particular exhaust flow of the combustion engine which drives the turbine of the turbo charger. This phenomenon, known as turbo lag, can be reduced in regard to its characteristic of turbo chargers which have a variable geometry, in which the turbine blades, dependent on the available, driving exhaust gas stream, are designed as adjustable blades. Since the turbo chargers with variable geometry are comparatively expensive to manufacture and can only be driven through complex control and monitoring methods, the motor vehicle industry has a demand for simpler mechanisms and/or methods to achieve also at a lower motor rotational speed, relatively high drive torque of the combustion engine.

Based on this background, it is known through DE 39 06 312 C1, as well as through DE 199 44 946 A1, each presenting a method and a mechanism for a reduction of the so-called turbo lag, where during acceleration of a diesel engine, equipped with a turbo charger, a certain amount of air from a compressed air container is injected into the intake manifold of the motor and where the amount of the injected fuel is matched accordingly. The required compressed air for the motor can hereby be taken from the compressed air storage of a compressed air brake system of a vehicle.

Also known from the earlier mentioned publications WO 2006/089779 A1 and WO 2006/089780 A1 is the use of a special mechanism, designed as a fresh air supply or compressed air supply, respectively, for the reduction of the mentioned turbo lag in a turbo charged combustion engine. This mechanism, positioned in the intake area of the combustion engine, has an air inlet tract as a intake manifold, which has an adjustable throttle and a first end flange for the inflow of the intake air, as well as a second end flange for the outflow in the direction of the cylinders of the motor. The throttle is coupled to an adjustment device which can be driven by a control device for the adjustment. Positioned between the throttle and the second end flange is a compressed air connection with an opening which merges into the pipe-shaped interior of the mechanism. It is also provided that the compressed air connector interacts with a quantity control mechanism which has a valve with closed and randomly opened positions, which can be driven, via an electrical input, by an electric control device. The adjustment device of the throttle is forced to operate by the quantity control mechanism and/or the control device in such a way, in case of a fully open position of the throttle, that a fully closed position is assigned to the quantity control mechanism at that time.

To control the mechanisms for the compressed air injection into the intake system of the combustion engine, known from the WO 2006/089779 A1 and WO 2006/089780 A1, the control device uses torque request signals which originate from the drive pedal, a traction control, a speed control system, and/or an electric stabilization program, or from means which pass on an external torque request to the engine control system.

It is also known from WO 2006/089779 A1 that, in case of the optimum control of the mechanism for the supply of the turbo charged combustion engine with compressed air—or with fresh gas—the control program of the control device in this mechanism knows predetermined parameters about the conditions, when an air injection has to be executed or terminated. For example, it can be taken into consideration that professional truck drivers or bus drivers each have individual drive habits, which require average acceleration parameters. Hence, such a driver can prefer certain shift points when shifting the transmission. These can be recognized by the named control device, and can be stored and processed. The data are used by the control device, for example, for the determination of the duration of the compressed air injection and for the activation of the throttle. It is intended, through this approach, to avoid the unnecessarily and disadvantageously high use of compressed air. It is especially intended hereby that the duration of the compressed air injection and the activation of the throttle are controlled adaptively by the control software in relationship to the frequency of the request of the driver for acceleration.

Also known from WO 2006/037564 A1 is a generic mechanism where the compressed air, taken from the compressed air storage, can also be instantly supplied in front of the intake valve of a cylinder of the combustion engine.

Because the interaction of a generic mechanism for the supply of a turbo charged combustion engine with additional compressed air, in accordance with WO 2006/089779 A1 and the WO 2006/089780 A1, is relatively complex with other mechanisms in the vehicle drive train, an optimal use of such a mechanism requires in a motor vehicle, whether it is a commercial vehicle or passenger vehicle, special control methods which take the particular characteristics and requirements of all these drive train components into consideration. The start procedure of such an equipped vehicle with a start and shift clutch has a particular significance.

SUMMARY OF THE INVENTION

Thus, it is the task of the invention to present a method for compatibly tuned control of a mechanism for the injection of additional compressed air into an intake system of a combustion engine and for the control of a start and shift clutch.

The solution of this task arises from the characteristics of the main claim, while advantageous further embodiments of the method of this invention are indicated in the dependent claims.

The invention is based on the knowledge that it is necessary, for optimal control of an actually known mechanism, for the supply of a turbo charged combustion engine with additional compressed air, to also consider the operational behavior of other mechanisms and/or aggregates which are present in a vehicle drive train. Thus, the present invention deals with the, optimal for the operation, interaction of a start and shift clutch with the mechanism for the supply of a turbo charged combustion engine with compressed air.

The term "transmission" is meant to cover all versions of transmissions, for instance manual shift transmissions, automatic transmissions, power transmissions, double clutch transmissions, ratio automatic transmissions, and also continuous shift transmissions.

The phrase "mechanism for the injection of additional compressed air into an air injection tract of a combustion engine" is meant to cover all the previously mentioned mechanisms, independent of whether the compressed air or the fresh gas, respectively, is taken from a compressed air container of a compressed air brake or from above the mechanism in the vehicle, or whether the compressed air is generated, conditioned as required, instantly by an electric motor operated air pump. The so-called mechanism comprises all required parts and aggregates for the operation.

Furthermore, the invention is suitable for all mechanisms that supply turbo charged combustion engines with compressed air, independent of whether the compressed air is injected into the intake system far from the cylinders of the combustion engine, or whether the compressed air is injected directly in front of the inlet valve of such a cylinder and its respective inlet area.

Thus, the invention presents a method of operating a vehicle drive train with a combustion engine, a turbo charger assigned to this combustion engine, a mechanism for the injection of additional compressed air into an intake system of the combustion engine, and a transmission. For the preparation and execution of a start procedure, it is provided that additional compressed air can only be injected into the combustion engine, if doing so will lead, dependent on the actual operating situation of the vehicle for the safety of the driver, the fuel consumption, and/or the drive comfort and the clutch wear, to an advantageous performance of the vehicle.

Through such operation of the mechanism for the injection of additional compressed air into an intake system of the combustion engine it is assured, that their undisputable advantages, in an interaction with the other components of the vehicle, do not have a counterproductive effect.

A further development of the invention provides that, during a start procedure, a coordinated activation of the start and shift clutch and the mechanism for the injection of additional compressed air into the intake system of the combustion engine takes place in a way so that the speed of positioning or the dynamic behavior of a clutch activator, as well as the timing, the pressure, and the duration of the injection of additional compressed air are coordinated with each other. This method makes sure that the initiated increase of engine torque, which is caused by the injection mechanism, takes place exactly when it is also desired for the start procedure. It needs to be considered in this case that the start and shift clutch also interacts with the vehicle transmission and its tasks during the start procedure.

It can be provided in an additional embodiment of the invention that the coordinated activation of the start and shift clutch and the mechanism for the injection of additional compressed air can be controlled, dependent on the vehicle mass M, the driving resistance Fw, the road slope α, the route ahead GPS, the ambient temperature T, the start time expected or predetermined by the driver, and stored in a control device or as a calculated start time interval, the performance request L of the driver, and/or the dynamic behavior of the mechanism for the injection of additional compressed air and the clutch actuator. The named parameters are measured, during the execution of the method, in a known manner through suitable sensors and passed on to a suitable control device, or calculated in it, or in another control device of the vehicle.

Analysis of the named parameters can lead to an automated decision that the mechanism for the injection of additional compressed air, during the start condition, is not activated and the start condition is processed through an engagement of the start and shift clutch in only the suction condition of the combustion engine, or with the support of the exhaust turbo charger at higher engine rotational speed. Such an operating condition can occur, for instance, if the engine torque, requested by the driver, is lower or equal to the engine torque at the initial, pure suction operation of the combustion engine. The term of "initial, pure suction operation" shall of course emphasize, that, in a start operation also at later, higher rotational speed of the combustion engine, the effect of the exhaust turbo charger takes place.

It can also be provided that, during a start procedure, the injection of additional compressed air into the air intake system of the combustion engine takes place immediately when, due to available route information about the intended roadway, it is obvious that the vehicle is facing an uphill slope on the route ahead. Hereby and during the start at an uphill slope, the increased drive resistance is compensated for by an instant increase of engine torque through the injection of additional compressed air, as well as through a matched amount of fuel.

It is provided, in another variation, that, prior to a start procedure, an air compressor for the generation of the required compressed air is instantly started, if it is clear, due to the tour information of the route ahead, that the vehicle needs to start at the uphill slope or that such uphill slope is imminent, and that a compressed air container, which is positioned in the vehicle, falls below the predetermined lower filling level. It is achieved through this anticipated operation, that the compressed air container is always sufficiently filled prior to uphill slopes, to enable a compressed air injection into the intake system of the combustion engine and its increase of the torque.

It is also considered as advantageous, when provided, that injection of additional compressed air into the air intake system of the combustion engine takes place during a start procedure in such a way, that the slippage time of the start and shift clutch, as well as the start rotational speed of the combustion engine is reduced through an increased engine torque. Through this operation, the operating life of the friction lining of the start and shift clutch is advantageously increased, also fuel will be possibly saved, or better exhaust emissions of the combustion engine can be achieved.

Furthermore, it can be provided in accordance with the invention, that an injection of additional compressed air into the intake system of the combustion engine takes place in a start procedure in the way, that, during the start of the combustion engine by means of an engine starter, the engine starter will be relieved in the beginning through high gas pressures in the combustion chamber of the combustion engine. The initial gas pressures in the combustion chamber of the combustion engine are hereby generated through such compressed air which is, in this case, preferably and instantly blown at the intake valves of the combustion engine.

Also, such an equipped vehicle, in accordance with the invention, can be operated in a way so that the injection of additional compressed air into the air intake system of the combustion engine is activated or deactivated by an anti-blocking system, an anti-slippage regulation system, a roll stabilization program, an off road program, and/or by a distance regulation program, dependent on safety relevant decision criteria. Hereby, the different control devices which belong to the particular safety functions, as well as the control device for the clutch control and the injection mechanism, are networked to share technological information with each other so that an intended injection of additional compressed air into the intake system of the combustion engine, caused by other control functions, can be prevented or even terminated if safety relevant criteria are causing it.

Finally, in an additional embodiment of the invention it can be provided that the injection of additional compressed air into the intake system of the combustion engine is manually activated or deactivated by the driver. Hereby, the driver has the option, ensuring all safety precautions, to override an intended or terminated injection of additional compressed air into the air intake system of the combustion engine, caused by one of the named control devices, thus, initiating a respectively different control procedure. For this enablement, the driver has in the cabin the respective displays and actuation devices available which are connected with at least one of the named, relevant control devices. Hereby, the driver can, in case of a malfunction of the sensors or the control devices, still control the drive, as well as the meaningful, safe sequence of a possible compressed air supported start procedure.

BRIEF DESCRIPTION OF THE DRAWINGS

In the following, the invention is explained in detail based on an embodiment example. For that purpose among a description of the drawing is attached. It is shown in FIG. 1 a schematic representation of a drive train with a mechanism for the injection of compressed air into the air intake system of a combustion engine.

DETAILED DESCRIPTION OF THE PREFERRED EMBODIMENTS

Figure 1:
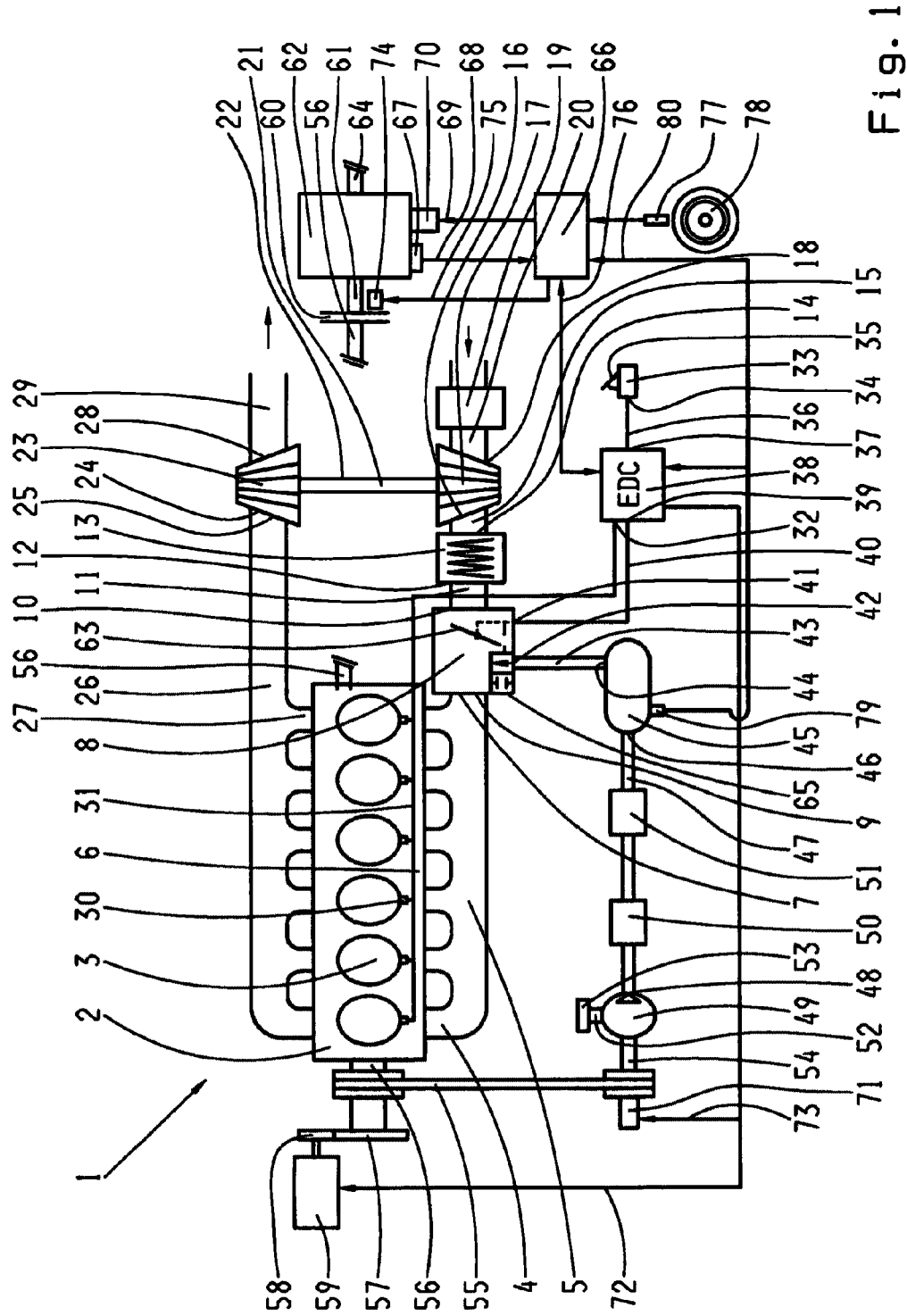

The presented vehicle drive train in FIG. 1 comprises a diesel engine 2, equipped with a turbo compressor 17, six cylinders 3, positioned in a row in the cylinder block 6. The section pipes 4 of the cylinders 3 are connected to the manifold 5 which has a connection flange 7, to which an air intake system 8 is connected with its second end flange 9 for the outflow of air. The first end flange 10, for the inflow of air, is coupled, via a pipe 11, with the outflow opening 12 of an intercooler 13, and its intake opening 14 is coupled, via a pipe 15, with the outflow opening 16 of the turbo compressor 17. An air filter 19 is connected with the pipe 20, to the intake opening 18 of the turbo compressor 17. The turbo compressor 17 forms a part of the turbo charger 22, where its exhaust turbine 23 is connected with its intake opening 24 to the outflow opening 25 of the exhaust manifold 26. The turbo compressor 17 and the exhaust turbine 23 are attached to a pivoted shaft 21. The cylinders 3 are connected, via the exhaust pipes 27, to the exhaust manifold 26 and the outflow opening 28 of the exhaust turbine 23 is connected with the exhaust pipe 29 to effect flow.

The fuel supply of the cylinders 3 takes place via injection nozzles 30, and the regulation takes place via the cable 31 from the first output 32 to of the electronic control device (EDC) 38. Attached to the input 37 of the electronic control device 38 via the cable 36 is the output 34 of the electronic control device 33. This last mentioned control device 33 is provided with an actuation part, which is designed for this embodiment example as the drive pedal 35. The electric connection 39 of the electronic control device 38 is coupled via the manifold 40 with the electric connector 41 of the air intake system 8. The dotted control cable at the air intake system 8 makes it clear that the electronic control device 38 drives a servomotor (not shown here) for the actuation of the throttle 63. Through this throttle 63, the available amount of air which the diesel engine 2 takes in can be regulated.

The air intake system 8 has a compressed air connector 42, which is connected, via the pipe 43, to the outflow connector 44 of a compressed air container 45. The feed connector 46 of the compressed air container 45 is connected via the pipe 47 to the compressed air connector 48 of an air compressor 49. The pipe 47 also has with it a pressure regulator 50 and an air dryer 51 installed. The air compressor 49 has an intake port 52 which is provided with an air filter 53. The shaft 54 of the air compressor 49 is connected, via a belt drive 55, with the main shaft 56 of the turbo charged diesel engine 2. However, the invention also covers those air compressors which are driven by an electric motor (not shown here), for instance, regulated by the electronic control device 38.

FIG. 1 shows also that the air compressor 49 can be connected, via a clutch 71, that is controllable by the named electronic control device 38 and via a control cable 73, with the belt drive 55 at the combustion engine 2, so that the air compressor 49 is only activated by the control device 38, if the pressure in the compressed air container 45 has to be refilled. For the determination of the actual pressure in the pressure container 45, a pressure sensor 79 is positioned there, and its measured signal is transmitted, via a sensor cable 80, to the control device 38 and/or to the transmission control device 66.

Activation of the air compressor 49 takes place advantageously, in accordance with the invention and for example, when the vehicle is in the deceleration mode at a downward slope, to increase the brake effect of the drive train 1 by using the power consumption of the air compressor 49.

Furthermore, FIG. 1 shows that the combustion engine 2 can be driven and started by an electric motor engine starter 59, which can mesh, via a pinion 58, with a sprocket 57 of the flywheel of the combustion engine 2. The flywheel is mounted with the sprocket 57 in a known manner on the main shaft 56 of the combustion engine 2. The engine starter 59 is connected, via a control cable 72, with the electronic control device 38 of the mechanism for injection of additional compressed air and can be switched on or off by the control device 38.

Also, an electromagnetic control and regulating valve 65, which can be driven by the control device 38, is positioned in the pipe 43, through which an injection or blow-in of additional compressed air from the compressed air container 45 into the air intake system 8 is made possible, if it is meaningful, especially for the increase of torque of the diesel engine 2. The control valve 65 is driven by the electronic control device 38 via the manifold cable 40, which branches in the area of the air intake system 8 in to a control cable (small dotted line) to drive the servo motor of the throttle 63, and into a control cable (large dotted line) for the drive of the control valve 63.

The FIG. 1 also shows schematically that the combustion engine 2, on the output side, is connected in a rotationally fixed manner via its main shaft 56 with the input side of a start and shift clutch 60, while the output side of the start clutch 60 is coupled with the transmission input shaft 61 of an automatic transmission 62. The start clutch 60 is designed as an automatic operating clutch and therefore is equipped with a clutch actuator 74, which is connected, via a control cable 75, with the transmission control device 66, also receiving the commands from it.

If required by the operating behavior of the diesel motor combustion engine 2, a torsional vibration damper, not shown here, can also be positioned on the input side of the start clutch 60, which is, however, commonly known. The automatic transmission 62 as an output shaft, which is linked, via (not shown) drive shafts and a differential gear, with the vehicle wheels 78.

The automatic transmission 62 is in this present embodiment, designed as an automatic shifting transmission, where its known gear actuators 70 are connected, via control cables 69, with the transmission control device 66. By means of the gear actuators 70, the transmission gears can be shifted in a commonly known manner and general gear transmission ratio changes can be executed. Also the transmission control device 66 is connected, via sensor cables 68, with the sensors at the transmission 62, through which the transmission control device 66 determines the relevant shifting information. Such information contains initially the rotational speeds of the transmission input shaft 61 and the transmission output shaft 64, as well as displacement signals and/or position signals of the gear actuators 70. Also, via the transmission control device 66, and/or via the control device 38, and by means of a rotational speed sensor 77 which is positioned at the transmission output shaft 64, or at a vehicle wheel 78, the speed of the vehicle is determined, as well as the determination of the engine speed via a main shaft 56 of the combustion engine 2. On this basis and other available information, the procedures for the gear ratio changes in the automatic transmission 62 are prepared and executed.

The drive train 1 functions, in regard to the basic function of the device 8 for the fresh air supply of the diesel engine 2, as follows:

The cylinders 3 of the turbo charged diesel engine 2 are supplied with fresh gas via the intake manifold 4, the manifold 5, the air intake system 8, the pipe 11, the intercooler 13, the pipe 15, the turbo compressor 17, and the air filter 19, if the engine rotational speed is constant. The exhaust gases exit the cylinders 3 via the exhaust pipes 27, the exhaust manifold 26, the exhaust turbine 23, and the exhaust pipe 29.

If the driver quickly steps on the drive pedal 35, to rapidly increase the engine torque, or the engine rotational speed, respectively, the diesel engine 2 requires more fuel and more fresh gas, or air, than shortly before. The additional fuel is fed into the cylinders 3, but the increase in the amount of the fresh gas which is provided by the turbo charger 22, remains inadequate. Also at a low engine rotational speed, the pressure of the fresh gas in the intake system 8 is low, which in the interior is constantly determined by a pressure sensor (not shown) and transmitted to the electronic control device 38. At that operating state, the throttle 63 is fully opened. The electronic control device 38 now determines, by means of the control program, that the pressure within the air intake system 8 has not increased fast enough, and that an additional air injection needs to be executed.

The control program has predetermined data of the conditions and when an additional air injection has to begin. Initially, the throttle 63 will be adjusted in the closed direction and the compressed air injection is enabled through opening of the valve 65 of the compressed air container 45 into the air intake system 8. The duration of the air injection is also predetermined by the control program which considers the difference in pressure and the absolute pressure in the air intake system 8.

By means of the control program, it is intended to initially prevent the compressed air consumption from the compressed air container 45 if it is at a level, such that the safety of the brake and its compressed air brake system, connected to the compressed air container 45, is not negatively affected.

Figure 2:
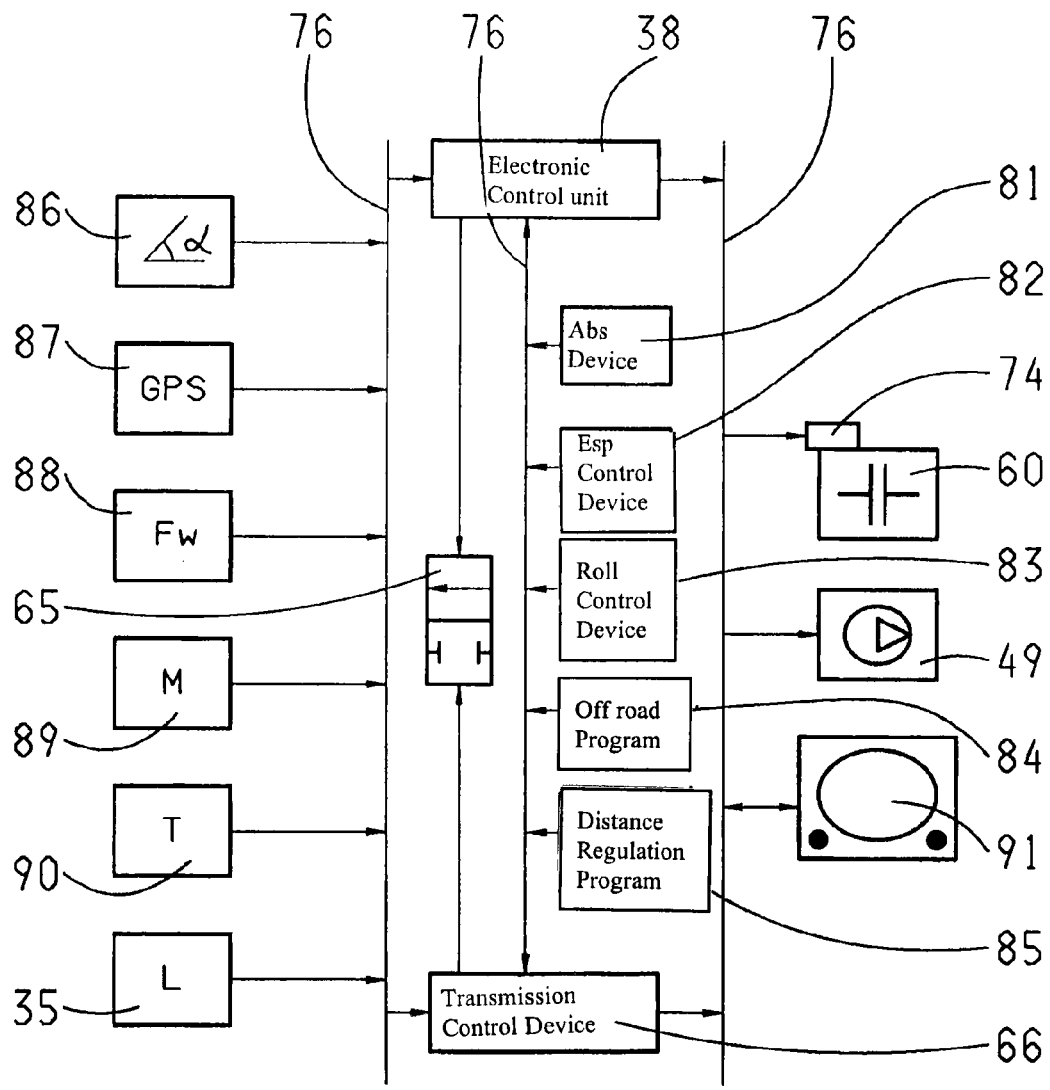
FIG. 2 a block diagram concerning the information technological network of sensors, control devices, and display devices, as well as input devices of the drive train in accordance with FIG. 1.

It can also be seen in FIGS. 1 and 2 that the transmission control device 66 is connected, via a data cable 76 of a CAN-bus, with the control device 38 of the mechanism for the injection of additional compressed air, whereby the latter can also be described as an engine control device. Between these two control devices 38, 66, in accordance with the invention, a constant exchange of information takes place to determine whether an injection of additional compressed air should take place, and if yes, at which amount the injection of additional compressed air into the intake system 8 of the combustion engine 2 shall take place, to increase the engine torque and to support a transmission shifting.

Because of this exchange of information, the start procedures through the start and shift clutch 60, as well as the gear ratio change procedures or gear shifting, respectively, in the automatic transmission 62 are meaningfully executable in a vehicle where such mechanism for the injection of additional compressed air into the air intake system 8 of the combustion engine 2 is implemented. In addition, an exact coordination of controlling the injection of additional compressed air into the intake system 8 of the combustion engine 2 and for the preparation and execution of gear ratio change procedures of the automatic transmission 62 enables advantageous operating modes of the vehicle drive train 1, which were up to now impossible and which have already been mentioned previously in the text.

With this background, the start procedure of such an equipped vehicle has a special importance, because it begins generally with such low engine rotational speeds that an engine torque increase, by means of the exhaust turbo charger 22, does not take place yet. This is especially unfavorable when, for instance, a vehicle with less horsepower, or any heavily loaded commercial vehicle needs to be started at an uphill slope. In addition, there are also other, safety relevant conditions which require a coordinated interaction of the start and shift clutch 60 with the control device 38 for the control of the injection of compressed air into the intake system 8 of the combustion engine 2.

The invention provides in this case that additional compressed air is only injected into the air intake system 8 of the combustion engine 2 if it will lead, depending on the actual operating situation of the vehicle for the safety of the driver, the fuel consumption, and/or the drive comfort and the clutch wear, to advantageous performance of the vehicle.

Hereby, it can especially be provided that, during a start procedure, the coordinated activation of the start and shift clutch 60 and the mechanism for the injection of additional compressed air into the air intake system 8 of the combustion engine 2 takes place in a way, such that the positioning speed or the dynamic behavior of a clutch actuator 74, as well as the time, the pressure, and the duration of the injection of additional compressed air are compatible with each other.

As shown in FIG. 2, there is an advantage if the coordinated activation of the start and shift clutch 60 and the mechanism for the injection of additional compressed air is regulated by adjustment of the regulating valve 65, depending on the vehicle mass M, the drive resistance Fw, the road slope α, the upcoming route GPS, the ambient temperature T, the duration of the start which is expected by the driver, or previously determined and calculated or stored in a control device 38, 66, the performance request L of the driver, and/or the dynamic behavior of the mechanism for the injection of additional compressed and of the clutch actuator 74.

Hereby, the mentioned route information GPS can be derived from a satellite supported navigation system 87, while the values for the vehicle mass M can derive from a vehicle mass sensor 89, the ambient temperature T from a temperature sensor 90, the road slope a from a gradient sensor 86 or the navigation system 87, the performance request L from the driver through a positioning angle sensor at the drive pedal 35, and the actual drive resistance Fw can derive from a drive resistance calculation program 88.

The mentioned operating conditions are made available in the CAN-bus-system (data cable 76) to both control devices 38, for the compressed air injection, and 66 for the transmission and clutch control, which can drive the regulation valve 65 of the injection mechanism for its actuation. As shown in FIG. 2, other control devices 81 and 85 are also linked, via the CAN-bus, with both control devices 38 and 66, like the actuator 74 of the start and shift clutch 60, the air compressor 49, as well as a display and adjustment mechanism 91 for the driver, which will be discussed further down in the text.

In regard to an optimal operation of the drive train 1, it is provided in accordance with the invention that the mechanism for the injection of additional compressed air is specifically not activated, if the engine torque, requested by the driver, is lower or equal to the engine torque in the initial, pure suction operation of the combustion engine 2.

It is also determined as being advantageous if, during a start procedure, an injection of additional compressed air into the air intake system of the combustion engine 2 takes place immediately, if it is obvious, due to route information (GPS), that the vehicle needs to start at an uphill slope or that such uphill slope is imminent.

Another operating condition can be provided in a way that, prior to a start procedure, an air compressor 49 is immediately activated for the generation of the required compressed air if, based on the route information (GPS), the vehicle needs to start at an uphill slope or that such uphill slope in the route is imminent, as well when a compressed air container 45 falls below a predetermined lower level.

In addition, an injection of additional compressed air into the air intake system 8 of the combustion engine 2 during a start procedure can take place in a way that, through an increased engine torque, the slippage time of the start and shift clutch 60, as well as the start rotational speed of the combustion engine 2, is reduced.

Also, the drive train 1 and the control device, in accordance with FIG. 2, can be operated such that an injection of additional compressed air into the air intake system 8 of the combustion engine 2 during a start procedure takes place, during the start of the combustion engine 2 by means of an engine starter 59 which is relieved through initially, high gas pressures in the ignition chamber of the combustion engine 2.

Also, the invented method can be designed in a way that the injection of additional compressed air into the air intake system 8 of the combustion engine 2 is activated or deactivated by an anti-lock brakes system 81, a drive slippage regulation system 82, a roll stabilization program 83, an off road program 84, and/or by a distance regulation program 85, dependent on safety relevant decision criteria.

Finally, FIG. 2 shows, based on input and display devices 91, that the injection of additional compressed air into the air intake system 8 of the combustion engine 2 can be manually activated or deactivated by the driver, if a specific reason exists.

REFERENCE CHARACTERS

1 Vehicle Drive Train
2 Combustion Engine, Diesel Engine
3 Cylinders
4 Intake Manifold
5 Manifold
6 Cylinder Block
7 Connection Flange
8 Air Intake System
9 Second End Flange, Outflow Area
10 First End Flange, Intake Area
11 Pipe
12 Outflow Opening
13 Intercooler
14 Intake Opening
15 Pipe
16 Outflow Opening
17 Turbo Compressor
18 Intake Opening
19 Air Filter
20 Pipe
21 Shaft
22 Turbo Charger, Exhaust Turbo Charger
23 Exhaust Turbine
24 Intake Opening
25 Outflow Opening
26 Exhaust Manifold
27 Exhaust Pipe
28 Outflow Opening
29 Exhaust Pipe
30 Injection Nozzle
31 Cable
32 Output
33 Control Unit
34 Output
35 Drive Pedal
36 Cable
37 Input
38 Electronic Control Unit
39 Connection
40 Manifold Cable
41 Connector
42 Compressed Air Connector
43 Pipe
44 Outflow Connector
45 Compressed Air Container
46 Feed Connector
47 Pipe
48 Compressed Air Connector
49 Compressed Air Connector
50 Pressure Regulator
51 Air Dryer
52 Intake Port
53 Air Filter
54 Shaft
55 Belt Drive
56 Main Shaft
57 Sprocket
58 Pinion of the Engine Starter
59 Engine Starter
60 Start and Shift Clutch
61 Transmission Input Shaft
62 Transmission, Automatic Transmission
63 Throttle
64 Transmission Output Shaft
65 Control and Regulating Valve
66 Transmission Control Device
67 Sensor at the Transmission
68 Sensor Cable
69 Control Cable to the Transmission Actuator 70

70 Actuator at the Transmission
71 Actuator at the Clutch of the Compressed Air Kompressor
72 Control Cable to the Engine Starter
73 Control Cable to the Actuator 71
74 Clutch Actuator
75 Control Line to the Clutch Actuator
76 Data Cable, CAN-Bus
77 Rotational speed Sensor
78 Vehicle Wheel
79 Pressure Sensor
80 Sensor Cable
81 Device, ABS
82 Control Device, ESP
83 Control Device, Roll Stabilization
84 Off-Road-Program
85 Distance Regulation Program
86 Gradient Sensor
87 Navigation System, GPS
88 Drive Resistance Calculation Program
89 Vehicle Mass Sensor
90 Temperature Sensor
91 Input and Display Device
α Road Gradient
Fw Drive Resistance
GPS Road Information, Course of Road
L Drive Power Request of the Driver
M Vehicle Mass
T Ambient Temperature

The invention claimed is:

1. A method for operating a vehicle drive train (1) comprising a combustion engine (2), a turbo charger (22) assigned to the combustion engine, a mechanism for injecting additional compressed air into an air intake system (8) of the combustion engine (2), a start and shift clutch (60) and a transmission (62), the method comprising the step of:
   only injecting additional compressed air into the air intake system (8) of the combustion engine (2) during preparation for and execution of a start procedure if, depending upon an actual operating situation of the vehicle, the injection of additional compressed air into the air intake system (8) benefits at least one of driver safety, fuel consumption, drive comfort and clutch wear; and
   coordinating activation of the start and shift clutch (60) and the mechanism for injecting additional compressed air into the air intake system (8) such that either a positioning speed or a dynamic behavior of a clutch actuator (74), and a time, a pressure, and a duration of the injection of the additional compressed air into the air intake system (8) are coordinated with each other.

2. The method according to claim 1, further comprising the step of controlling the coordinated activation of the start and shift clutch (60) and the mechanism for the injecting additional compressed air depending upon at least one of a vehicle mass (M), a drive resistance (Fw), a road gradient (α), an approaching course of road (GPS), an ambient temperature (T), either a duration of a start which is either expected by the driver or previously determined and stored in a control device (38, 66) or a calculated start time span, a performance request (L) of the driver, and a dynamic behavior of the mechanism for injecting additional compressed air into the air intake system (8), and the clutch actuator (74).

3. The method according to claim 1, further comprising the step of purposely not activating, during a start procedure, the mechanism for injecting additional compressed air into the air intake system (8) if engine torque, requested by the driver, is either lower than or equal to an engine torque during an initial pure suction operation of the combustion engine (2).

4. The method according to claim 1, further comprising the step of immediately initiating the injection of additional compressed air into the air intake system (8) of the combustion engine (2), during a start procedure, if and due to road information (GPS), the vehicle will either start on an uphill slope or travel along an uphill slope is imminent.

5. The method according to claim 1, further comprising the step of immediately activating an air compressor (49), prior to a start procedure, if and due to road information (GPS), the vehicle will either start on an uphill slope or travel along an uphill slope is imminent, and an amount of compressed air within a compressed air container (45) falls below a previously determined lower fill level.

6. The method according to claim 1, further comprising the step of injecting additional compressed air into the air intake system (8) of the combustion engine (2) during a start procedure such that by an increased engine torque, a slippage time of the start and shift clutch (60) and a starting rotational speed of the combustion engine (2) is reduced.

7. The method according to claim 1, further comprising the step of injecting additional compressed air into the air intake system (8) of the combustion engine (2), during a start procedure, such that, when starting the combustion engine (2) with an engine starter (59), relief is provided to an engine starter (59) through initially high gas pressures in a combustion chamber of the combustion engine (2).

8. The method according to claim 1, further comprising the step of controlling activation of the injection of additional compressed air into the air intake system (8) of the combustion engine (2) depending upon input from an anti-lock brake system (81), a drive slippage regulation system (82), a roll stabilization program (83), an off road program (84), a distance regulation program (85), and safety relevant decision criteria.

9. The method according to claim 1, further comprising the step of enabling the driver to manually control activation of the injection of additional compressed air into the air intake system (8) of the combustion engine (2).

* * * * *